United States Patent
Safai

(10) Patent No.: US 11,293,884 B2
(45) Date of Patent: Apr. 5, 2022

(54) MULTI SOURCE BACKSCATTERING

(71) Applicant: The Boeing Company, Chicago, IL (US)

(72) Inventor: Morteza Safai, Newcastle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/736,602

(22) Filed: Jan. 7, 2020

(65) Prior Publication Data

US 2021/0208086 A1 Jul. 8, 2021

(51) Int. Cl.
*G01N 23/203* (2006.01)
*G01N 23/20008* (2018.01)

(52) U.S. Cl.
CPC ..... *G01N 23/203* (2013.01); *G01N 23/20008* (2013.01); *G01N 2223/053* (2013.01)

(58) Field of Classification Search
None
See application file for complete search history.

(56) References Cited

U.S. PATENT DOCUMENTS

| | | | |
|---|---|---|---|
| 7,529,343 B2 | 5/2009 | Safai et al. | |
| 8,033,724 B2 | 10/2011 | Edwards et al. | |
| 8,094,781 B1 | 1/2012 | Safai et al. | |
| 8,503,610 B1 | 8/2013 | Safai | |
| 8,761,338 B2 | 6/2014 | Safai | |
| 8,855,268 B1 | 10/2014 | Safai et al. | |
| 9,128,030 B1 | 9/2015 | Safai et al. | |
| 9,151,721 B2 | 10/2015 | Safai | |
| 9,715,613 B2 | 7/2017 | Safai et al. | |
| 10,178,748 B1* | 1/2019 | Steck | H01J 35/18 |
| 2006/0285645 A1* | 12/2006 | Hoffman | H01J 35/064 378/119 |
| 2010/0074392 A1* | 3/2010 | Behling | H01J 35/153 378/4 |
| 2011/0002442 A1* | 1/2011 | Thran | H01J 35/065 378/22 |
| 2017/0336526 A1* | 11/2017 | Arodzero | G01N 23/203 |
| 2018/0076000 A1* | 3/2018 | Safai | G01N 23/203 |
| 2019/0302038 A1 | 10/2019 | Safai et al. | |
| 2019/0304735 A1 | 10/2019 | Safai | |
| 2020/0098535 A1* | 3/2020 | Marconnet | H01J 9/18 |

\* cited by examiner

*Primary Examiner* — Hoon K Song
(74) *Attorney, Agent, or Firm* — MH2 Technology Law Group LLP

(57) ABSTRACT

An x-ray source for a backscatter imager can include a first electron beam (e-beam) emitter for emitting a first e-beam and at least a second e-beam emitter for emitting at least a second e-beam. The first and second e-beam emitters can be powered by a at least one power supply, and can be configured to direct the first e-beam and the second e-beam toward an anode. An interaction of the anode with the first and second e-beams produces x-rays. The x-ray source is configured to output an amount of x-rays equivalent to a conventional x-ray source that includes a single e-beam emitter. However, because the x-ray source uses at least two e-beam emitters and a single anode, the power source required to power the e-beam emitters can operate at a lower wattage than a conventional power source powering the single e-beam emitter. The x-ray source is thus lighter in weight and outputs less radiation than conventional systems with a comparable x-ray output.

20 Claims, 3 Drawing Sheets

MULTI SOURCE BACKSCATTERING

TECHNICAL FIELD

The present teachings relate to the field of backscatter imaging and, more particularly, to a backscatter imager and a method using the backscatter imager.

BACKGROUND

Backscatter x-ray imaging (i.e., backscatter imaging or backscatter) is an increasingly important tool in the field of security as well as other uses. Backscatter imaging has various advantages over conventional x-ray imaging. For example, backscatter imaging uses reflected radiation to obtain an image from one side of the imaging target, contrary to traditional x-ray techniques which transmits radiation through the imaging target and thus requires access to two opposite sides of the imaging target. Further, radiation emitted during backscatter imaging is non-destructive compared to radiation emitted from traditional x-ray equipment.

A typical mobile backscatter imager can include a 225 kilo-electron volts (keV) x-ray source powered at 3,000 Watts (W), which is sufficient to penetrate International Organization for Standardization (ISO) containers.

A backscatter imager having advantages over conventional systems would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, an x-ray source for a backscatter imager includes an anode, a first electron beam (e-beam) emitter configured to output a first e-beam toward the anode, at least a second e-beam emitter configured to output a second e-beam toward the anode, and at least one power supply configured to power the first e-beam emitter, the second e-beam emitter, or both the first e-beam emitter and the second e-beam emitter. In this implementation, the anode is positioned to generate the x-rays resulting from an interaction of the anode with the first e-beam and the second e-beam. Optionally, x-ray source can further include a shield having a window, the anode can be configured to direct the x-rays toward the window, and the window and the shield can be configured to produce an x-ray beam from the x-rays.

Further optionally, the first e-beam emitter can be configured to operate at 1,500 watts, the second e-beam emitter can be configured to operate at 1,500 watts, and the at least one power supply can be configured to power the first e-beam emitter at 1,500 watts, and to power the second e-beam emitter at 1,500 watts.

The x-ray source can further include a third e-beam emitter configured to output a third e-beam toward the anode and a fourth e-beam emitter configured to output a fourth e-beam toward the anode. In this implementation, each of the first e-beam emitter, the second e-beam emitter, the third e-beam emitter, and the fourth e-beam emitter can be configured to operate at 750 watts, and the at least one power supply is configured to power each of the first e-beam emitter, the second e-beam emitter, the third e-beam emitter, and the fourth e-beam emitter at 750 watts. Optionally, the at least one power supply includes a first power supply configured to power the first e-beam emitter and a second power supply configured to power the second e-beam emitter.

In another implementation, a backscatter imager includes an x-ray source including an anode, a first electron beam (e-beam) emitter configured to output a first e-beam toward the anode, at least a second e-beam emitter configured to output a second e-beam toward the anode, and at least one power supply configured to power the first e-beam emitter, the second e-beam emitter, or both the first e-beam emitter and the second e-beam emitter. The backscatter imager further includes a shield having a window, wherein the anode is configured to direct x-rays resulting from the first e-beam and the second e-beam toward the window and the backscatter imager is configured to produce an x-ray beam from the x-rays when the x-rays pass through the window. The backscatter imager further includes a rasterizer configured to rasterize the x-ray beam and an x-ray sensor configured to detect reflected x-rays that are reflected from a target. Optionally, the first e-beam emitter is configured to operate at 1,500 watts, the second e-beam emitter is configured to operate at 1,500 watts, and the at least one power supply is configured to power the first e-beam emitter at 1,500 watts and to power the second e-beam emitter at 1,500 watts. Further optionally, the backscatter imager further includes a third e-beam emitter configured to output a third e-beam toward the anode and a fourth e-beam emitter configured to output a fourth e-beam toward the anode. Each of the first e-beam emitter, the second e-beam emitter, the third e-beam emitter, and the fourth e-beam emitter can be configured to operate at 750 watts, and the at least one power supply can be configured to power each of the first e-beam emitter, the second e-beam emitter, the third e-beam emitter, and the fourth e-beam emitter at 750 watts.

The at least one power supply can include a first power supply configured to power the first e-beam emitter and a second power supply configured to power the second e-beam emitter. The backscatter imager can further include an air cooling subsystem, wherein the backscatter imager comprises no liquid cooling subsystem, as well as a controller configured to process image data, a first data bus between the x-ray sensor and the controller, a display configured to display a backscatter image, and a second data bus between the controller and the display. The x-ray sensor can be configured to detect reflected x-rays that are reflected from the target and to pass the image data corresponding to the x-rays detected by the sensor to the controller on the first data bus. The controller can be further configured to pass the processed image data to the display on the second data bus.

In another implementation, a method for generating a backscatter image includes emitting a first electron beam (e-beam) from a first e-beam emitter and at least a second e-beam from at least a second e-beam emitter toward an anode, producing x-rays resulting from an interaction of the anode with the first e-beam and the second e-beam, directing the x-rays toward a target, collecting x-rays reflected from the target, and processing the collected x-rays reflected from the target to generate a backscatter image. The method can optionally include directing the x-rays toward a window in a shield to generate an x-ray beam and the directing of the x-rays toward the target comprises directing the x-ray beam toward the target. Further, the x-ray beam can be rasterized using a rasterizer prior to the directing of the x-ray beam toward the target. Further optionally, the method can include powering the first e-beam emitter at 1,500 watts and powering the second e-beam emitter at 1,500 watts, and may further include emitting a third e-beam from a third e-beam emitter and a fourth e-beam from a fourth e-beam emitter toward the anode and producing x-rays resulting from an interaction of the anode with the third e-beam and the fourth e-beam. The first e-beam emitter, the second e-beam emitter, the third e-beam emitter, and the fourth e-beam emitter can be powered at 750 watts. Additionally, the collecting of the x-rays reflected from the target can include collecting the x-rays reflected from the target using an x-ray sensor. The method can further include passing image data from the x-ray sensor to a controller on a first data bus, processing the image data using the controller to generate processed image data, passing the processed image data from the controller to a display on a second data bus, and displaying the backscatter image on the display.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally and/or where convenient, the same reference numbers will be used throughout the drawings to refer to the same or like parts.

As discussed above, backscatter imaging is a useful tool in the field of security and other uses. For example, a high power backscatter imager including a 225 keV x-ray source powered at 3,000 W can penetrate more than four millimeters of steel. In some uses, a high power backscatter imager is mounted to an interior of a vehicle such as a Z backscatter van (ZBV) and used to inspect, for example, cargo and occupants of other vehicles or containers.

While current high power backscatter imagers powered by a 3,000 W source function sufficiently for their intended purpose, they have a considerable weight. In part, the relatively large weight results from a size of one or more power supplies that are required to power the backscatter imager. The weight is further increased by the requirement for a fluid coolant to cool the backscatter imager to prevent overheating during operation of the backscatter imager. Thus a backscatter imager including supporting subsystems such as a liquid cooling subsystem used in a ZBV application can weigh up to 100 kilograms. This significant weight limits the portability of the backscatter imager and increases costs. Further, conventional systems emit relatively high amounts of radiation that are a safety concern, thus the radiation must be shielded which further adds to weight and cost to the backscatter imager.

Smaller and lighter backscatter imagers that use a lower output 200 W or 500 W power source are available but emit an insufficient quantity of x-rays for use in equipment such as a ZBV. Thus a 3,000 W power source has heretofore been required to produce sufficient x-rays required to penetrate common thicknesses of steel and produce an acceptable backscatter image within an adequately short duration of time.

An implementation of the present teachings can include a backscatter imager that has a reduced weight and power requirements compared to conventional backscatter imagers, while maintaining a high x-ray output. Further, an implementation can mitigate the requirement for a fluid cooling subsystem to prevent thermal damage during operation of the backscatter. In an optional implementation, the backscatter imager of the present teachings can include the use of an air cooling subsystem and no liquid cooling, compared to conventional systems that require a liquid cooling subsystem that increases the weight of conventional backscatter imaging systems.

Figure 1:
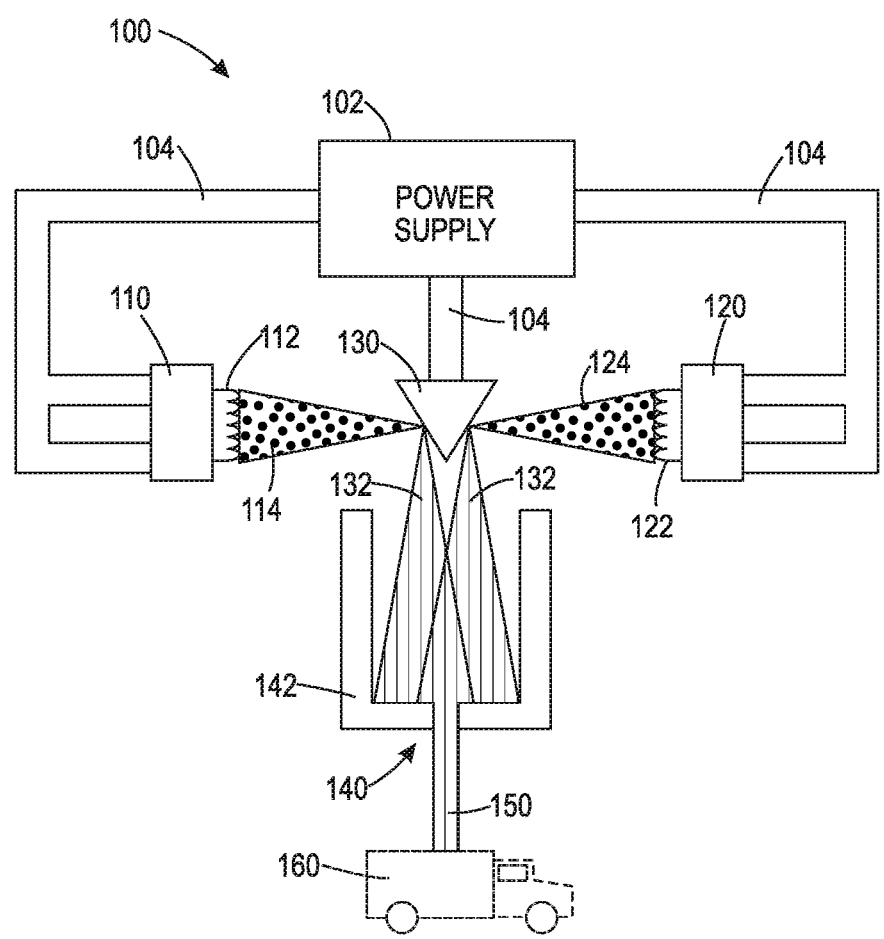
FIG. 1 is a schematic depiction of an x-ray source in accordance with an implementation of the present teachings.

FIG. 1 is a schematic view of an x-ray source 100 that can be a subsystem of a backscatter imager in an implementation of the present teachings. It will be appreciated that the figures are schematic depictions. An actual structure in accordance with one or more implementations of the present teachings can include other structures, features, and/or subsystems that have not been depicted for simplicity, while various depicted structures, features, and/or subsystems can be removed or modified.

The x-ray source 100 of FIG. 1 includes a first electron beam (e-beam) emitter 110 (i.e., a first cathode) with a first filament 112 and at least a second e-beam emitter 120 (i.e., a second cathode) with a second filament 122. Each of the first e-beam emitter 110 and the second e-beam emitter 120 are electrically coupled to a power supply 102 with one or more cables 104 or other electrical connections. The x-ray source 100 further includes an anode 130, which can also be electrically coupled to, and powered by, the power supply 102 with the one or more cables 104.

When powered by a current from the power supply 102, the first and second filaments 112, 122 heat and release electrons. The electrons are attracted toward the positively charged anode 130, such that the first e-beam emitter 110 emits a first electron beam 114 and the second e-beam emitter 120 emits a second electron beam 124. Upon striking the anode 130, an interaction between the e-beams 114, 124 and the anode 130 produces heat and generates x-rays (i.e., x-ray photons) 132, and the x-rays 132 are directed by the anode 130 toward an aperture (e.g., a window) 140 within a shield 142. The x-rays 132 that pass through the aperture 140 form an x-ray beam 150. During use of the backscatter imager (200, FIG. 2) including the x-ray source 100, the x-ray beam 150 is rasterized and directed onto a target 160. X-rays from the x-ray beam 150 reflected from the target 160 are detected and/or collected, for example by an x-ray sensor (234, FIG. 2), and processed to produce an image (244, FIG. 2).

In an implementation, the filaments 112, 122 and anode 130 can be or include, for example, tungsten or one or more other suitable materials. It will be understood that the x-ray source 100 can include other features and/or structures that have not been depicted for simplicity, for example, focusing cups, a casing such as a lead casing, a glass envelope that enables a vacuum, etc.

As discussed above, generation of a suitable image requires an x-ray source to output a suitable amount of x-rays. With some prior systems, the x-ray source includes a single cathode powered at 3,000 W to output a sufficient amount of x-rays. In contrast, the x-ray source 100 of the present teachings includes two (or more) cathodes, where each cathode is powered at half (or less) than 3,000 W, for example at 1,500 W or less, to output approximately the same amount of x-rays as the single-cathode systems powered at 3,000 W. Thus a system in accordance with the present teachings generates a suitable x-ray photon flux with a power supply powered at a lower wattage, a lighter weight, and that output less harmful radiation than conventional systems. For example, compared to some conventional backscatter imagers that can with 100 kilograms, a system in accordance with the present teachings can weigh from about 10 kilograms to about 15 kilograms. The x-ray photon flux of the present teachings provides a scanning rate and contrast that are suitable for backscatter imaging using a lower wattage power source than conventional systems, and that has the advantages as described herein.

Figure 2:
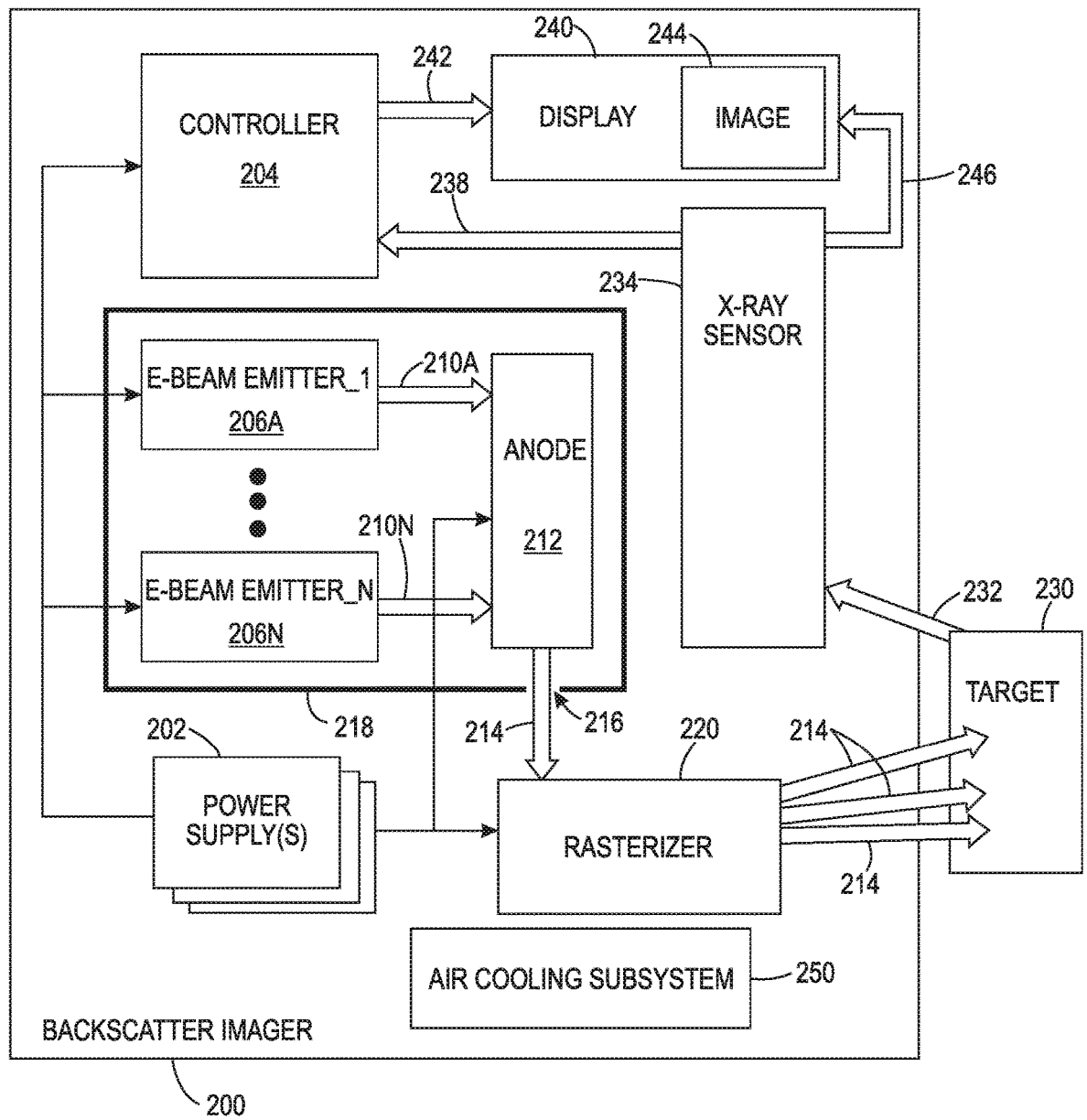
FIG. 2 is a block diagram of a backscatter imager in accordance with an implementation of the present teachings.

FIG. 2 is a block diagram of a backscatter imager 200 in accordance with another implementation of the present teachings. This example implementation includes one or more power supplies 202 electrically coupled to, and configured to power, other elements of the backscatter imager 200. FIG. 2 further depicts a controller 204 configured to monitor and/or control other elements of the backscatter imager 200. The controller 204 can include electrical components such as one or more microprocessors, memory, firmware, etc., which are not individually depicted for simplicity. The backscatter imager 200 further includes a first e-beam emitter 206A and at least a second e-beam emitter 206N, where N is 2 or more. In an implementation, the backscatter imager 200 can include three, four, or five or more e-beam emitters 206A-206N. For example, a backscatter imager 200 including four e-beam emitters 206 (i.e., a first e-beam emitter outputting a first e-beam, a second e-beam emitter outputting a second e-beam, a third e-beam emitter outputting a third e-beam, and a fourth e-beam emitter outputting a fourth e-beam) can power each e-beam emitter 206 (i.e., 206A-206N, where N=4) at 750 W to produce an x-ray photon flux equal to a conventional system with a single e-beam emitter powered at 3,000 W.

Each of the e-beam emitters 206A-206N are configured to output an e-beam 210A-210N respectively when powered. The two or more e-beams 210A-210N are directed onto an anode 212 as depicted, for example, using two or more focusing cups (not individually depicted for simplicity). In general, only a single anode 212 will be required, where multiple e-beams 210A-210N are directed toward the single anode 212. Upon striking the anode 212, an interaction between the e-beams 210 and the anode 212 produces x-rays (i.e., x-ray photons) 214. The x-rays 214 are directed by the anode 212 toward an aperture (e.g., a window) 216 within a shield 218. The aperture 216 can include a transparent cover such that a vacuum can be applied to an interior of the shield 218. It will be appreciated that the shield 218 can enclose the e-beam emitters 206A-206N and the anode 212 within the vacuum.

The x-rays 214 directed by the anode 212 can be rasterized by a rasterizer 220, where the rasterizer 220 indexes the x-rays 214 and directs the x-rays 214 toward the target 230 using a desired bitmap. At least a portion of the x-rays 232 are reflected from the target 230 toward, and are detected and/or collected by, at least one x-ray sensor 234. Image data corresponding to the x-rays 232 collected by the x-ray sensor 234 can be passed to the controller 204 on a first data bus 238 for processing by the controller 204 to generate processed image data. The processed image data can then be passed from the controller 204 to a display 240 on a second data bus 242, where the processed image data is used to produce a backscatter image 244. The display 240 can then display the backscatter image 244 representing the processed data corresponding to the reflected x-rays 232 for review, for example, by an operator. It is contemplated that the x-ray sensor 234 itself may process the collected x-ray data, exclusively or in addition to the processing by the controller 204, and pass the processed data directly to the display 240 on a third data bus 246. In an implementation, the backscatter imager 200 can be cooled solely with an air cooling subsystem 250, in contrast to conventional backscatter imagers that require a liquid cooling system.

Figure 3:
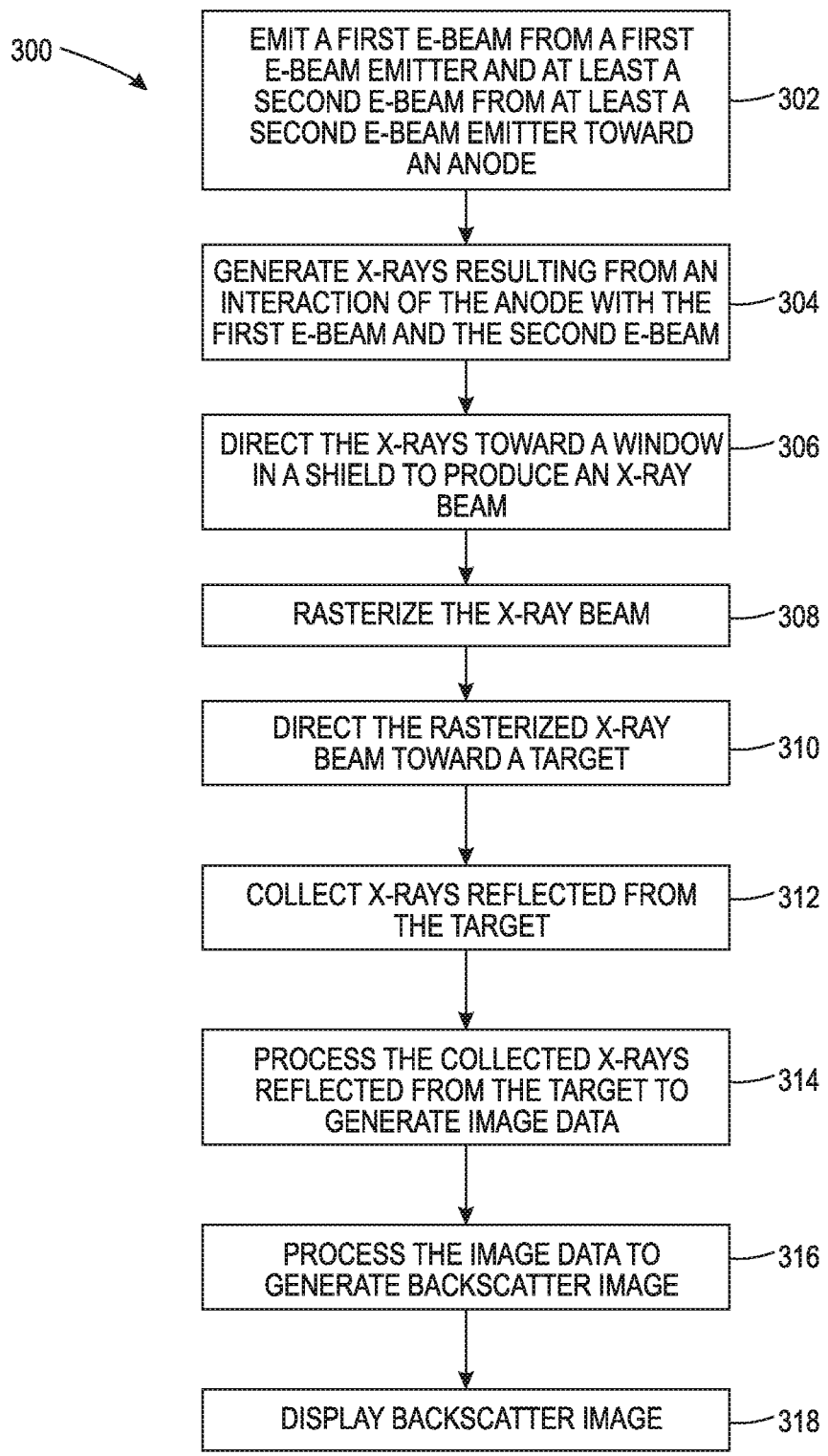
FIG. 3 is a flow chart or flow diagram of a method for generating a backscatter image in accordance with an implementation of the present teachings.

FIG. 3 is a flow chart or flow diagram of a method 300 for generating a backscatter image 244 (FIG. 2). The method 300 may proceed by operation or use of one or more of the structures depicted in FIGS. 1 and 2 described above, and thus the method is described with reference to these figures; however, it will be appreciated that the method 300 is not limited to any particular structure or use unless expressly stated herein. The method 300 may be performed before, during, or after other processes, for example, as an assembly sub-process. It will be appreciated that while the process is described as a series of acts or events, the present teachings are not limited by the ordering of such acts or events. Some acts may occur in different orders and/or concurrently with other acts or events apart from those described herein. Further, a method in accordance with the present teachings may include other acts or events that have not been depicted for simplicity, while one or more depicted acts or events may be removed or modified as sub-processes of the method 300.

The method 300 for generating a backscatter image 244 can begin by emitting a first e-beam 114 from a first e-beam emitter 110 and emitting at least a second e-beam 124 from at least a second e-beam emitter 124 toward an anode 130 as at 302. An interaction between the anode 130 with the first e-beam 114 and the second e-beam 124 produces x-rays 132 as at 304, which are then directed by the anode 130 as at 306. At 308, the x-rays 132 directed by the anode 130 can be rasterized using a rasterizer 220, and are directed toward a target 160, 230 as at 310. Reflected x-rays 232 that are reflected from the target 160, 230 are collected by an x-ray sensor 234, and the collected x-rays are processed to generate image data as at 314. At 316, the image data is processed, for example, by the x-ray sensor 234 or a controller 204, to generate a backscatter image 244, which can be displayed, for example, on a display 240 such as a computer screen, as at 318.

Thus an implementation of the present teachings can be used to form a backscatter imager that can output x-rays. The backscatter imager can output an amount of x-rays equivalent to a high powered backscatter imager (e.g., a single e-beam emitter powered at 3,000 W) using a lower output power supply (e.g., using two e-beam emitters each powered at 1,500 W, using four e-beam emitters each powered at 750 W, etc.). Thus use of a lower output power supply decreases heating of the backscatter imager during use, and thus a liquid cooling subsystem can be replaced with a lighter weight air cooling subsystem.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. —1, –2, –3, –10, –20, –30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. An x-ray source for a backscatter imager, the x-ray source comprising:
    an anode;
    a first electron beam (e-beam) emitter configured to output a first e-beam toward the anode;
    a second e-beam emitter configured to output a second e-beam toward the anode, wherein the second e-beam emitter is disposed at a different positional location compared to the first e-beam emitter;
    a third e-beam emitter configured to output a third e-beam toward the anode;
    a fourth e-beam emitter configured to output a fourth e-beam toward the anode; and
    at least one power supply configured to power the first e-beam emitter, the second e-beam emitter, or both the first e-beam emitter and the second e-beam emitter,
    wherein the anode is positioned to generate the x-rays resulting from an interaction of the anode with the first e-beam and the second e-beam; and
    wherein the backscatter imager comprises no liquid cooling subsystem and an air cooling subsystem cools the x-ray source.

2. The x-ray source of claim 1, wherein:
    the x-ray source further comprises a shield having a window;
    the anode is configured to direct the x-rays toward the window; and
    the window and the shield are configured to produce an x-ray beam from the x-rays.

3. The x-ray source of claim 1, wherein:
    the first e-beam emitter is configured to operate at 1,500 watts;
    the second e-beam emitter is configured to operate at 1,500 watts; and
    the at least one power supply is configured to power the first e-beam emitter at 1,500 watts, and to power the second e-beam emitter at 1,500 watts.

4. The x-ray source of claim 1, wherein:
    each of the first e-beam emitter, the second e-beam emitter, the third e-beam emitter, and the fourth e-beam emitter are configured to operate at 750 watts; and
    the at least one power supply is configured to power each of the first e-beam emitter, the second e-beam emitter, the third e-beam emitter, and the fourth e-beam emitter at 750 watts.

5. The x-ray source of claim 1, wherein the at least one power supply comprises a first power supply configured to power the first e-beam emitter and a second power supply configured to power the second e-beam emitter.

6. A backscatter imager, comprising:
    an x-ray source comprising:
        an anode;
        a first electron beam (e-beam) emitter configured to output a first e-beam toward the anode;
        a second e-beam emitter configured to output a second e-beam toward the anode, wherein the second e-beam emitter is disposed at a different positional location compared to the first e-beam emitter;

a third e-beam emitter configured to output a third e-beam toward the anode;
a fourth e-beam emitter configured to output a fourth e-beam toward the anode; and
at least one power supply configured to power the first e-beam emitter, the second e-beam emitter, or both the first e-beam emitter and the second e-beam emitter;
a shield having a window, wherein:
the anode is configured to direct x-rays resulting from the first e-beam and the second e-beam toward the window; and
the backscatter imager is configured to produce an x-ray beam from the x-rays when the x-rays pass through the window;
a rasterizer configured to rasterize the x-ray beam;
an x-ray sensor configured to detect reflected x-rays that are reflected from a target; and
an air cooling subsystem that cools the backscatter imager, and wherein the backscatter imager comprises no liquid cooling subsystem.

7. The backscatter imager of claim 6, wherein:
the first e-beam emitter is configured to operate at 1,500 watts;
the second e-beam emitter is configured to operate at 1,500 watts; and
the at least one power supply is configured to power the first e-beam emitter at 1,500 watts, and to power the second e-beam emitter at 1,500 watts.

8. The backscatter imager of claim 6, wherein:
each of the first e-beam emitter, the second e-beam emitter, the third e-beam emitter, and the fourth e-beam emitter are configured to operate at 750 watts; and
the at least one power supply is configured to power each of the first e-beam emitter, the second e-beam emitter, the third e-beam emitter, and the fourth e-beam emitter at 750 watts.

9. The backscatter imager of claim 6, wherein the at least one power supply comprises a first power supply configured to power the first e-beam emitter and a second power supply configured to power the second e-beam emitter.

10. The backscatter imager of claim 6, further comprising:
a controller configured to process image data;
a first data bus between the x-ray sensor and the controller;
a display configured to display a backscatter image; and
a second data bus between the controller and the display, wherein:
the x-ray sensor is configured to detect reflected x-rays that are reflected from the target and to pass the image data corresponding to the x-rays detected by the sensor to the controller on the first data bus; and
the controller is further configured to pass the processed image data to the display on the second data bus.

11. A method for generating a backscatter image, comprising:
emitting a first electron beam (e-beam) from a first e-beam emitter, a second e-beam from a second e-beam emitter toward an anode, a third e-beam from a third e-beam emitter, and a fourth e-beam from a fourth e-beam emitter toward the anode, wherein the second e-beam emitter is disposed at a different positional location compared to the first e-beam emitter;
producing x-rays resulting from an interaction of the anode with the first e-beam, the second e-beam, the third e-beam, and the fourth e-beam;
directing the x-rays toward a target;
collecting x-rays reflected from the target; and
processing the collected x-rays reflected from the target to generate a backscatter image; and
cooling the backscatter imager with an air cooling subsystem, without the use of a liquid cooling subsystem.

12. The method of claim 11, further comprising:
directing the x-rays toward a window in a shield to generate an x-ray beam; and
the directing of the x-rays toward the target comprises directing the x-ray beam toward the target.

13. The method of claim 11, further comprising rasterizing the x-ray beam using a rasterizer prior to the directing of the x-ray beam toward the target.

14. The method of claim 11, further comprising:
powering the first e-beam emitter at 1,500 watts; and
powering the second e-beam emitter at 1,500 watts.

15. The method of claim 11, further comprising powering the first e-beam emitter, the second e-beam emitter, the third e-beam emitter, and the fourth e-beam emitter at 750 watts.

16. The method of claim 11, wherein the collecting of the x-rays reflected from the target comprises collecting the x-rays reflected from the target using an x-ray sensor, and the method further comprises:
passing image data from the x-ray sensor to a controller on a first data bus;
processing the image data using the controller to generate processed image data;
passing the processed image data from the controller to a display on a second data bus; and
displaying the backscatter image on the display.

17. The x-ray source of claim 2, wherein the x-ray source is configured such that a vacuum can be applied to an interior of the shield.

18. The backscatter imager of claim 6, wherein the backscatter imager is configured such that a vacuum can be applied to an interior of the shield.

19. The backscatter imager of claim 18, wherein the backscatter imager is configured such that the shield encloses the first e-beam emitter, the second e-beam emitter, the third e-beam emitter, and the fourth e-beam emitter e-beam emitters and the anode.

20. The method of claim 12, further comprising applying a vacuum to an interior of the shield.

* * * * *